INVENTOR
WILLARD E. KEMP
BY Eugene N. Riddle

ATTORNEY

Aug. 4, 1970 W. E. KEMP 3,522,972
GRANULAR MATERIAL SEPARATOR AND CONVEYOR

Filed May 13, 1968 2 Sheets-Sheet 2

United States Patent Office 3,522,972
Patented Aug. 4, 1970

3,522,972
GRANULAR MATERIAL SEPARATOR AND
CONVEYOR
Willard E. Kemp, Bridgeton, Mo., assignor to ACF Industries Incorporated, New York, N.Y., a corporation of New Jersey
Filed May 13, 1968, Ser. No. 728,584
Int. Cl. B65g 29/00
U.S. Cl. 302—49     3 Claims

ABSTRACT OF THE DISCLOSURE

A motor-driven star shaped rotary airlock valve is mounted in a tightly fitting housing. One or more walls of the valve are covered by a screen. Granular material is conveyed to the top of the valve by a vacuum air line or conduit and there filtered out by the screen, and thereafter removed from the bottom of the rotary valve by air under pressure forced through the screen by a blower. Since the screen rotates with the valve, it is cleaned constantly by the air blown through it.

BACKGROUND OF THE INVENTION

The invention relates to apparatus for conveying granular, or powdered, or like material. Apparatus of this type is used for unloading railroad cars and other vehicles, for example. The material, according to one prior system, may be conveyed from the bottom of a hopper of the vehicle through a vacuum air line or conduit connected to a separator which extracts the material, or most of it. The extracted material may be fed through an airlock valve to a conduit in which air under pressure is supplied by a conduit. For finely ground material, such as flour or cement, two separators in series may be needed. The apparatus required to move the material from a vehicle, or the like, to a distant container may, thus, be rather bulky and complex.

SUMMARY OF THE INVENTION

A rotary airlock valve is provided having one or more walls formed by a permeable membrane. On the end of the airlock housing two air lines lead to and from a blower. On the other end of the airlock housing are two additional air lines, one leading from the source of the granular material and the other leading to the destination of the material.

In operation the blower draws a mixture of air and material into one side of the airlock. The permeable membrane allows the air to pass through the airlock but traps the material in the rotor. The airlock rotor is rotated continuously by a motor and carries the material to the opposite side of the airlock. The air which has been drawn to the blower is forced back through the permeable membrane, picks up the material, and transports it through an outlet conduit. Since the permeable membrane rotates with the rotor, the membrane is subjected to a cyclical change in the direction of air flow. This feature prevents material from blinding the membrane, as would be the case if the air moved through it in one direction only.

BRIEF DESCRIPTION OF THE DRAWING

The invention will be fully understood from the following description and the accompanying drawing in which.

DESCRIPTION OF THE PREFERRED EMBODIMENTS

Figure 2:
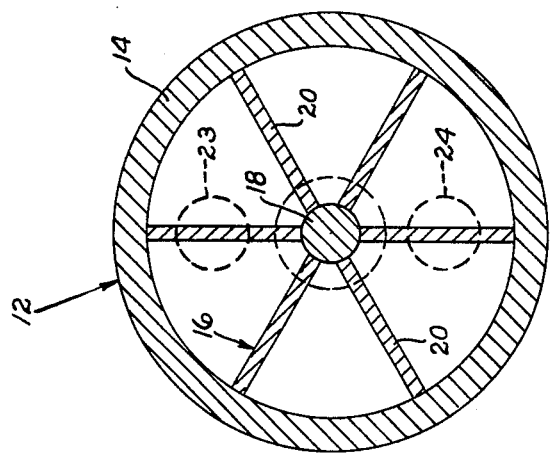
FIG. 2 is a sectional view taken along line 2—2 of FIG. 1.

Pipe or conduit 10 may extend to a bin, container, or hopper outlet from which granular, powdered, pelletized or like material is to be removed to a distant place, for example, as from a railroad car to a silo. The conduit 10, in such a case, is connected between the discharge outlet of a hopper of the railroad car and an opening 11 in an airlock-separator 12, comprising a housing 14 and a rotor 16. The rotor includes a shaft 18 mounted in hubs 17, 19, a plurality of vanes 20 radiating from shaft 18 to form channels extending in an axial direction, and a permeable membrane or screen 22 fixed to shaft 18 for forming one end of rotor 16. Housing 14 is provided with at least a pair of openings 23, 24, in which are fitted conduits 26, 28 connected to blower 30. Juxtaposed to opening 24 is opening 32, into which is fitted outlet conduit 34. Rotor shaft 18 is journaled at both ends in housing 14, and is fixed to shaft 36 of motor 38.

Rotor 16 is an airlock and separator of the material being conveyed. For this purpose, rotor 16 has a substantially air-tight fit to housing 14 at both sides and circumferentially. If desired vanes or blades 20 may be made of flexible material to permit a close or wiping engagement of the housing. Permeable membrane 22 is adapted to filter or separate the transported material, while permitting the air to be drawn therethrough. Membrane 22 may be a porous metal sheet of the type sold under the name Feltmetal by the Huyck Metals Corporation, 45 Woodmont Road, Milford, Conn. Alternatively, membrane 22 may be a screen of any porosity suitable for the material to be transported, made of metal, Teflon or other material.

Blower 30 may be a single or compound blower, and the air entering it through conduit 26 may be discharged to atmosphere or returned through conduit 28. If the air entering through conduit 26 is circulated, blower 30 may also supply "make up" air, to increase the air flow in conduit 28. An increased air flow is desirable in order to clean membrane 22 thoroughly as it rotates past conduit 28, and to remove all of the material at the bottom of the rotor. Blower 30 is designed to produce a vacuum in conduit 10 for causing or increasing the air flow through conduit 10 to produce a desirable rate of flow of the material being conveyed. Conduits 10 and 34 are positioned remote from screen or membrane 22 near the top and bottom of the rotor, but it will be evident that these conduits need not enter through the end of housing 14, but can enter through the top or bottom of the housing.

An important characteristic of the apparatus of the invention is the self-cleaning of the screen or membrane 22. Where pulverant or fine grained material is conveyed, and the pores of screen 22 are therefore very small, the screen would be clogged quickly if not cleaned continuously. But the portion of the screen at opening 23 is rotated to opening 24, and there the air is forced through the screen in the opposite direction and cleans the screen very effectively. The screen 22 is thus enabled to act as a very efficient filter. Since a clean portion of screen 22 is continuously presented to opening 23, a desired continuous flow through conduit 10 occurs. Opening 23 can be made of any desired size and shape.

Figure 1:
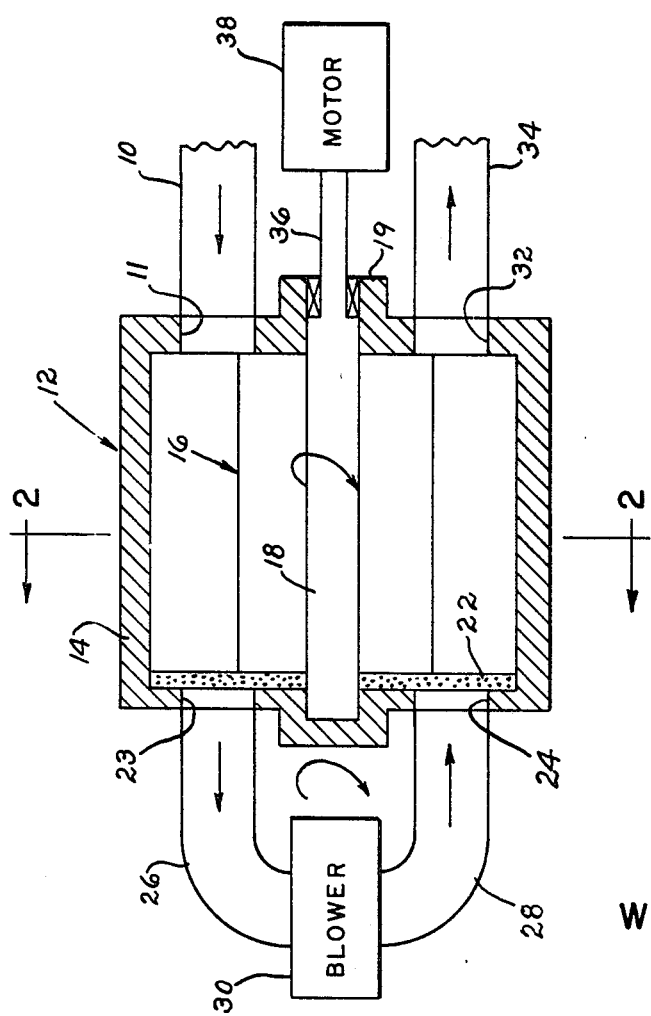
FIG. 1 is a schematic view of the apparatus partly in section.
Figure 3:
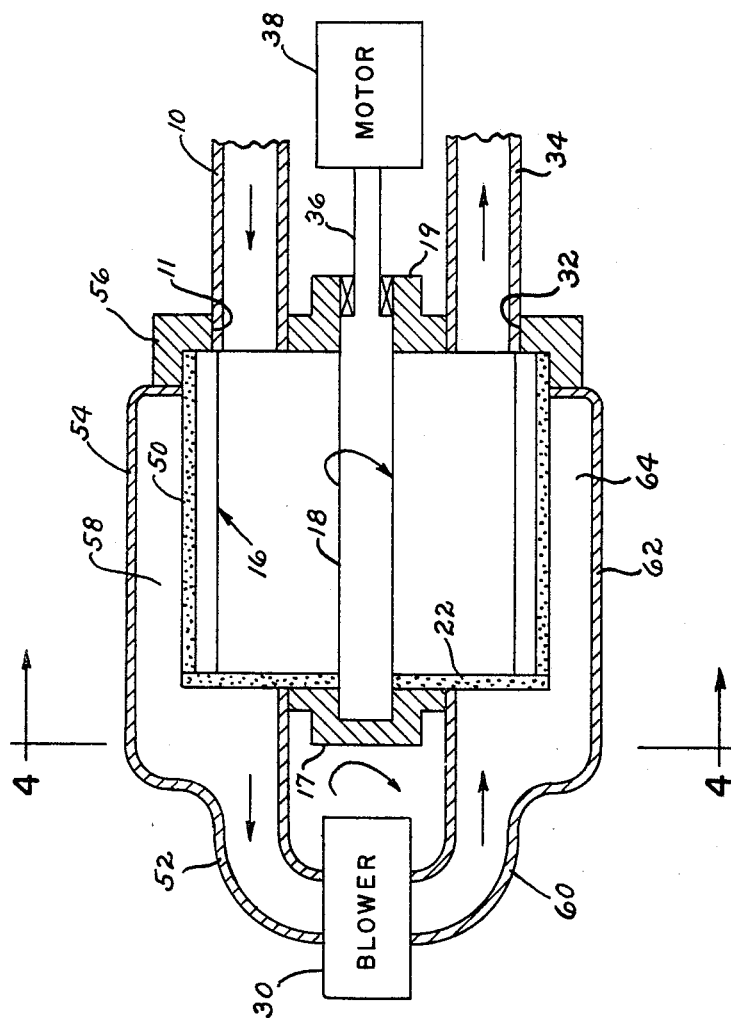
FIG. 3 is a schematic view, partly in section, of another embodiment.
Figure 4:
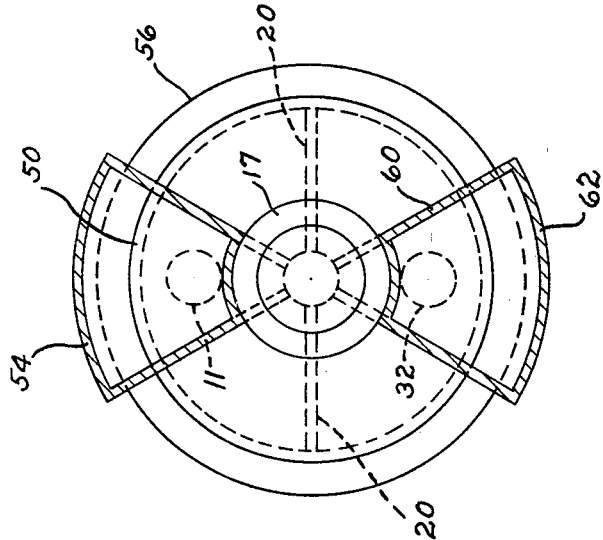
FIG. 4 is a sectional view taken along the line 4—4 of FIG. 3.

The embodiment of FIGS. 3 and 4 is similar to that of FIGS. 1 and 2, except that the entire circumference of the rotor is covered by screen 50. End screen 22 is used in addition, where maximum screening surface is desirable, but may not be needed for some materials and some conditions. Air exhaust conduit 52 has a portion 54, which is connected to the upper part of housing 56 and provides a chamber 58 round a part of screen 50. Air exhaust conduit 52 also communicates with screen 22 on the end wall of the rotor. Similarly, air supply conduit 60 communicates with screen 22 as well as circular screen 50, and has a portion 62 which forms a chamber 64 round a portion of screen 50. If screen 22 is not needed, a sturdy solid end wall may obviously be used in its place to give the rotor greater rigidity.

It will be evident that as rotor 16 turns, both screens 22 and 50 will be continuously cleaned by air blown therethrough by blower 30. The air blown upwardly through the bottom of screen 50 will serve to fluidize the material in the rotor and thus facilitate its removal by the air stream entering the rotor through screens 22 and 50. The material being conveyed is discharged from the rotor through conduit 34. Air blower 30, as previously noted, may have an intake from the atmosphere in addition to the air in conduit 52.

The invention has been presented in two illustrative embodiments, although it will be obvious to those skilled in the art that variations of said embodiments can be readily made.

What is claimed is:

1. In a system for pneumatically conveying granular or like material; an airlock comprising a substantially closed cylindrical housing; a cylindrical rotor mounted in said housing, including impervious radial blades dividing the rotor into at least four separate chambers, said rotor having a substantially horizontal drive shaft journaled in said housing; means for conveying said material to an upper portion of the rotor; means for discharging said material from a lower portion of the rotor, said housing having an air outlet enclosing a circumferential upper portion of the periphery of the rotor; an air inlet to said housing communicating with a lower portion thereof; and a cylindrical screen for said granular material extending circumferentially round the rotor and covering said air outlet and air inlet.

2. Apparatus according to claim 1, wherein a screen forms one end wall of the rotor.

3. Apparatus according to claim 1, wherein said screen forms one end wall and the periphery of the rotor.

References Cited

UNITED STATES PATENTS

| | | | |
|---|---|---|---|
| 2,921,721 | 1/1960 | Brooks | 302—49 |
| 3,450,441 | 6/1969 | Vogt | 302—49 |
| 2,301,350 | 11/1942 | Whitfield | 302—23 |

ANDRES H. NIELSEN, Primary Examiner